United States Patent
Bauman et al.

(10) Patent No.: US 7,047,322 B1
(45) Date of Patent: May 16, 2006

(54) SYSTEM AND METHOD FOR PERFORMING CONFLICT RESOLUTION AND FLOW CONTROL IN A MULTIPROCESSOR SYSTEM

(75) Inventors: Mitchell A. Bauman, Circle Pines, MN (US); Matthew D. Rench, Bloomington, MN (US); James L. Depenning, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 252 days.

(21) Appl. No.: 10/675,784

(22) Filed: Sep. 30, 2003

(51) Int. Cl.
 *G06F 13/00* (2006.01)
(52) U.S. Cl. .................... 710/6; 710/33; 718/105; 711/163; 711/141
(58) Field of Classification Search .............. 710/1, 710/6, 22–24, 33–35, 41, 52–56; 711/3, 711/141–159, 163–169; 718/101–105, 108
See application file for complete search history.

(56) References Cited

U.S. PATENT DOCUMENTS

| | | | | |
|---|---|---|---|---|
| 5,379,379 A | * | 1/1995 | Becker et al. ............. | 711/3 |
| 5,931,924 A | * | 8/1999 | Arimilli et al. ............ | 710/41 |
| 5,937,205 A | * | 8/1999 | Mattson et al. ............. | 710/6 |
| 6,078,981 A | * | 6/2000 | Hill et al. ................. | 710/200 |
| 6,092,162 A | * | 7/2000 | Chiang .................... | 711/163 |
| 6,487,643 B1 | * | 11/2002 | Khare et al. ............... | 711/150 |
| 6,574,689 B1 | * | 6/2003 | Zaidi et al. ............... | 710/52 |
| 6,816,945 B1 | * | 11/2004 | Harris et al. .............. | 711/135 |
| 2003/0145210 A1 | * | 7/2003 | Taylor ..................... | 713/182 |
| 2004/0225755 A1 | * | 11/2004 | Quach ..................... | 710/1 |

* cited by examiner

*Primary Examiner*—Christopher Shin
(74) *Attorney, Agent, or Firm*—Beth L. McMahon; Charles A. Johnson; Mark T. Starr

(57) ABSTRACT

The current invention provides a system and method for managing requests from one or more requesters to one or more resources. These requests, which may be any of multiple request types, are prioritized using one or more threshold values. Each threshold value is associated with one or more of the request types, and defines the maximum number of requests of the associated types that may be pending to the resources before the threshold is reached. When all associated thresholds have been reached for requests of one or more predetermined request types, an indication is provided to re-issue requests of those types at a later time. A priority scheme is used to allow re-issued requests to systematically gain access to the shared resource to prevent the starvation of any given requester.

32 Claims, 6 Drawing Sheets

SYSTEM AND METHOD FOR PERFORMING CONFLICT RESOLUTION AND FLOW CONTROL IN A MULTIPROCESSOR SYSTEM

FIELD OF THE INVENTION

The present invention relates generally to a multiprocessor system wherein multiple processors share system resources; and, more particularly, to a system and method for controlling the processing of requests to the shared resource in a manner that allows all requesters to gain access to the resource.

BACKGROUND OF THE INVENTION

In many data processing systems, one or more resources may be shared among the processors of that system. For example multiple instruction processors and/or I/O processors may share access to a common main memory. Other resources such as cache memories may also be shared in this manner. In these types of systems, some mechanism must be provided to throttle the issuance of the requests since, generally, only a limited number of requests can be queued to any given shared resource at once. Second, the system must implement some type of fairness algorithm to ensure that no one requester is denied access to the resource for an extended period of time. Ideally, this system further limits the number of requests queued to a given resource so that queuing latency does not exceed acceptable thresholds.

Several mechanisms are available for throttling requests. According to one mechanism, when a requester such as an instruction processor issues a request to a shared resource such as a main memory, that requester will not issue another request until some type of an acknowledgement signal is received from the main memory. However, if the time required for a request to travel to the main memory, and the corresponding acknowledgement to be returned to the processor, is relatively large, the issuance of requests by the processor may be unduly restricted. Thus, this type of throttling mechanism is generally only used in those instances where the request and associated response times are relatively small.

According to another mechanism for controlling the rate of requests, a flow control signal may be utilized to control the issuance of requests. This signal informs the requester to stop issuing new requests. When utilizing this mechanism, the shared resource must issue the flow control signal early enough to prevent queue overflow, since requests will continue to be issued while the flow control signal is enroute to the requester. Thus, in this configuration, limitations on request issuances may be overly restrictive.

Another technique for managing the issuance of requests to a shared resource involves the use of a debit/credit mechanism. In this type of system, each requester is granted a predetermined number of credits. When a requester issues a request, this number is debited. Conversely, when the shared resource has finished processing a request, the resource grants another credit to the requester that issued the completed request. A requester is allowed to continue issuing requests so long as it has one or more credits remaining. This type of solution is more logic intensive than the foregoing mechanisms.

Retry mechanisms provide yet another type of system for throttling requests. Retry mechanisms generally involve temporarily removing requests from queues to allow other requests to advance within the system. Selection of the requests that are allowed to advance is based on predetermined criteria that establishes some type of priority among requesters or types of requests.

Retry mechanisms generally provide good performance for high throughput multi-processor systems. However, such mechanisms may lead to the unwanted occurrence of "live-lock" situations. A live-lock situation involves the improbable but possible scenario wherein requests from one requester are continually retried and are therefore prevented from making progress. If one of these requests is associated with the return of some data or access rights that are needed to satisfy pending requests from other requesters, this unlikely scenario may cause the entire system to experience significant performance degradation.

What is needed, therefore, is an improved system and method for managing requests to a shared resource that addresses the foregoing problems.

SUMMARY OF THE INVENTION

The current invention provides a system and method for managing requests to a shared resource or a pool of shared resources. According to one embodiment of the invention, the shared resource is a shared main memory. A queue having multiple queue entries is provided to receive requests to this memory. Load control logic controls the entry of requests into the queue based on one or more threshold values. Each threshold value is associated with one or more request types, and defines the maximum number of requests of the associated types that may be stored within the queue before the threshold is reached.

The foregoing is best understood by example. Assume that requests of types X, Y, and Z are issued to a memory. A queue having sixteen queue entries is provided, with each entry being available to store one request. A first threshold may be created that is associated with request types X, Y, and Z. Assume this threshold is set to "five". This indicates that when any combination of types X, Y, and Z requests are stored within the queue, the first threshold is considered reached.

A second threshold may also be defined to control the entry of requests into the queue. Assume this second threshold is associated with request types X and Y, and is set to "ten". This indicates that after the first threshold of "five" has been reached, five additional queue entries are available to store any combination of requests that are of types X and Y.

Yet a third threshold may be defined. Assume this threshold is associated with the request type X and is set to "fifteen", indicating that after the second threshold value of ten is reached, five additional queue entries are available to store requests of type X. Any additional number of thresholds may be defined in this manner.

According to one embodiment, after all thresholds for a predetermined type of request have been reached, special request handling procedures must be employed. For example, if a request cannot be processed immediately because thresholds for the request type have been reached, a retry operation may be initiated. This involves providing a retry indication to the requester, which may be an Instruction Processor, Input/Output Processor, a shared cache, or some other entity. This retry indication directs that requester to re-issue the request to the main memory at a later time. In one exemplary embodiment, retry indications are only provided for read requests. In other embodiments, the retry mechanism may be employed for other request types.

As discussed above, systems that utilize the type of retry mechanisms described in the foregoing paragraph may result in the development of a live-lock situation. This involves the unlikely but possible scenario wherein one requester is consistently receiving retry indications such that no request from that requester is allowed to progress. To prevent this situation from arising, each requester that has received a retry indication and is subsequently waiting to re-issue a request is periodically granted an elevated status. According to one embodiment, a request that is issued by a requester that has been granted an elevated status is considered high priority, and is associated with a different threshold than other requests of the same type. If the thresholds are selected appropriately, this mechanism allows retried requests to have a higher probability of gaining entry into the queue. This, in turn, allows retried requests from each of the requesters to gain access to the shared resource so that live-lock situations will be prevented.

According to one embodiment of the invention, the types of requests recognized by the invention system and method may include read requests, write requests, retried read requests, and high-priority read requests. In another embodiment, any other type of requests may be defined for use with the invention.

One type of system that may utilize the current invention includes a main memory coupled to multiple processing nodes. Each processing node includes one or more requesters that issue read or write requests to the main memory. In this type of environment, a requester may issue a read request to main memory for data that has been copied to, and updated within, a different processing node. Completion of this read request requires the issuance of a request from main memory to the other processing node to obtain the updated data copy. Requesting this data from the other processing node may require significantly more time than merely storing data to the main memory, as is performed during a write request. Therefore, in this type of environment, a typical read request therefore requires more time to complete than a typical write request.

To optimize request processing in the foregoing exemplary system, the thresholds of the above example may be employed as follows. The first threshold may be associated with all requests, including all read and write requests. The second threshold may be associated with write requests. Since write requests can be completed without issuing requests to other processing nodes, dedicating more queue entries to these requests will result in higher request processing throughput. The second threshold may further be associated with retried requests, and with those read requests that have been granted an elevated status in the manner discussed above. Finally, the third threshold may be associated with write requests and retried read requests, since these types of requests can be completed entirely by the main memory and without any interdependence on a processing node.

According to yet another aspect of the invention, the third threshold may be selected to enable fewer than all queue entries. This may be beneficial to compress the queue, thereby reducing latency for any given request. Queue compression may also be usefully employed in a test situation such that worst-case scenarios may be more readily emulated.

As may be appreciated from the above description, it is possible that all thresholds may be reached. In this situation, special request handling must be initiated. In one embodiment, a hold signal is asserted to the requesters indicating that no more requests may be issued to the main memory until some of the requests stored within the queue are processed and removed.

To provide flexibility, and allow various thresholds to be changed as system needs dictate, the thresholds may be programmable. Additionally, in one embodiment, the request types associated with each threshold may also be programmable.

The foregoing provides one example of the way in which the inventive system may be employed to optimize request processing for a particular system configuration. It will be understood that other schemes may be devised to optimize the characteristics of different system architectures. Moreover, although the above description discusses the invention in terms of managing requests to a queue, the current invention can be used to manage and control the presentation of requests to any shared resource, or any pool of resources. For example, according to one embodiment of the invention, a main memory is coupled to multiple state machines. Any request to memory must gain access through an available one of these state machines, which then controls and manages completion of the memory reference. The state machines may therefore be described as a pool of resources that are shared between the multiple requesters, with the current invention being used to manage the flow of requests to this pool of resources.

According to one aspect of the invention, a method is provided for allowing a request that is any of multiple request types to gain access to any of multiple resources. This method includes the steps of defining one or more thresholds, each representing a respective predetermined number of the resources. Each threshold is associated with one or more of the request types. The method further includes receiving a request, and determining, for each threshold associated with the type of the request, whether fewer than the predetermined number of resources represented by the threshold are each handling a request of any associated request type. If so, the request is allowed to gain access to any available one of the resources.

According to another aspect of the invention, a system is disclosed for controlling the manner in which requests access a pool of resources. This system includes threshold means for storing one or more threshold values. Each threshold value determines a cumulative maximum number of requests that may gain access simultaneously to any of the resources and which are any of one or more request types that are associated with the threshold value. The system also includes load control means for receiving a request, for determining whether the request is of a type associated with one or more threshold values for which the cumulative maximum number of requests has not yet been reached. If so, the load control means allows the request to gain access to any available one of the shared resources.

Also disclosed is a method of processing requests issued by multiple requesters to a shared resource such as a main memory within a data processing system. This method includes the steps of defining one or more thresholds, each threshold being associated with one or more types of requests. Each threshold indicates the maximum number of requests of any of the associated types that may be pending simultaneously to the shared resource. The method further includes receiving a request, and determining, for each threshold associated with the type of the request, whether the maximum number of requests indicated by the threshold has been reached. If not, processing of the request is initiated.

In another embodiment, a system is described for controlling the manner in which requests are provided to a shared resource. The system includes one or more storage devices, each to store a respective threshold value that is associated with one or more types of requests. Each threshold value indicates a cumulative number of requests of the associated types that may gain access to the shared resource at any given time before the threshold value is reached. The system further includes load control logic coupled to each of the store devices to receive requests, and to allow each request to gain access to the shared resource if the type of the request is associated with a threshold value that has not yet been reached. The system also includes live-lock logic coupled to the load control logic to selectively elevate the status of a request that is of a type associated with one or more thresholds values that have been reached, thereby allowing the request to gain access to the shared resource.

Other scopes and aspects of the current invention will become apparent from the following description and accompanying drawings.

DETAILED DESCRIPTION OF THE DRAWINGS

Figure 1:
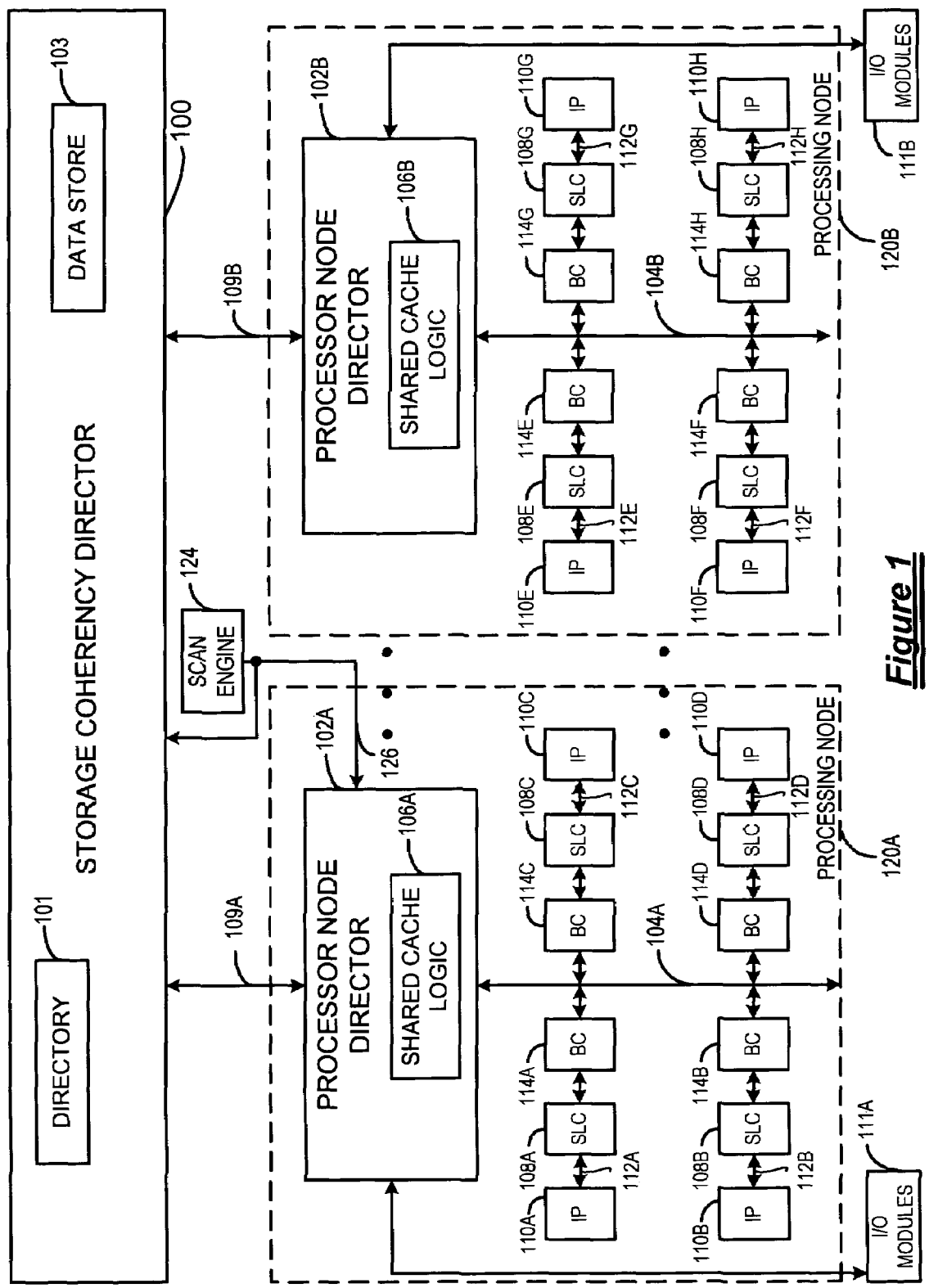
FIG. 1 is a block diagram of an exemplary data processing system that may utilize the current invention.

FIG. 1 is a block diagram of an exemplary data processing system that may employ the current invention. The system includes a Storage Coherency Director (SCD) 100 that provides the main memory facility for the system. Although for simplicity only a single SCD is shown, it will be understood that in a larger system, multiple SCDs are provided, each supporting a respective portion of the overall address range of the system.

In one embodiment, SCD is a directory-based storage unit. In this embodiment, SCD stores data within data store 103, and further retains information about this stored data in directory 101. Specifically, directory 101 stores information to track the state and location of any given data to ensure that every processor is operating from the latest copy. In the current embodiment, directory 101 includes an entry that tracks the state and location of each 128-byte block of memory within the SCD, where a 128-byte block is referred to as a cache line.

SCD 100 is coupled to one or more Processor Node Directors (PNDs) shown as PNDs 102A and 102B. In a system including multiple SCDs, each SCD will be similarly coupled to the PNDs 102. Moreover, the system may include more or fewer PNDs than are shown in FIG. 1.

In the illustrated system of FIG. 1, each PND is coupled to SCD 100 over one or more high-speed SCD interfaces shown as 109A and 109B that each includes data, address, and function lines. For simplicity, each PND is shown coupled to SCD 100 over a single interface.

Each PND includes logic to interface to the high-speed SCD interface, and further includes logic to interface to a respective processor bus such as processor bus 104A or 104B. These processor buses can employ any type of bus protocol. Each PND may further include shared cache and all supporting logic, shown as shared cache logic 106A and 106B, respectively. This cache logic may include a Third-Level Cache (TLC), a Fourth-Level Cache (4LC), or some other type of cache memory.

As noted above, each of PNDs 102A and 102B is coupled to a respective processor bus 104A and 104B. Each processor bus further couples to multiple local cache memories through respective Bus Controllers (BCs) 114. Each BC controls the transfer of data to and from the processor bus in a manner that conforms to bus protocol. In the current embodiment, Second-Level Caches (SLCs) 108A–108D are coupled to processor bus 104A through BCs 114A–114D, respectively. Similarly, SLCs 108E–108H are coupled to processor bus 104B through BCs 114E–114H, respectively. In another embodiment, these local caches may be Third-Level Caches.

Each SLC 108 is also coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on an Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

A PND, its respective processor bus, and the entities coupled to the processor bus may be referred to as a "processing node". In the current example, PND 102A, processor bus 104A, and all entities associated with processor bus including BCs 114A–114D, SLCs 108A–108D, and IPs 110A–110D may be referred to as processing node 120A. Similarly, PND 102B, processor bus 104B, and all entities associated with processor bus 104B comprise a second processing node 120B. Many other processing nodes may exist within the system.

Each processing node may be coupled to one or more I/O complexes, shown as I/O complexes 111A and 111B. Each of these I/O complexes contains one or more industry-standard or proprietary I/O modules that communicate with storage medium such as disk tape subsystems and communication equipment.

The system of FIG. 1 may further include a scan engine 124 coupled to a scan interface 126. Scan interface 126 is shown coupled to PND 102A and SCD 100 for simplicity, but it will be understood this scan interface would generally be coupled to some, or all, units within the system. In one embodiment, scan interface provides serial scan capabilities, as is known in the art. Scan engine is capable of performing read and write operations via scan interface 126 to various storage devices within the system before, or during, normal system operation. These read and write operations may be performed to initialize logic, diagnose and recover from error conditions, and change the contents of various programmable devices, as will be discussed further below.

Next, the retrieval of data by an IP is considered. During execution, an IP is accessing programmed instructions and data from SCD 100 and its respective caches. For example, when IP 110A requires access to a memory address, it first attempts to retrieve this address from its internal cache(s) such as its FLC. If the requested address is not resident in the FLC, a request is sent to the respective SLC 108A. If the requested data is likewise not resident within the SLC, the SLC forwards the request to the processor bus 104A.

In one embodiment, all BCs on a processor bus implement a snoop protocol to monitor, or "snoop", the processor bus for requests. In the current example, BCs 114B–114D snoop the request initiated by IP 110A and SLC 108A. The snooped request is transferred by each BC to its associated SLC to determine whether that SLC has a modified copy of the requested cache line. If so, the updated data copy will be returned to requesting SLC 108A via processor bus 104A during a Processor Bus Write-Back (PBWB) operation. Additionally, SLCs 108B–108D may have to invalidate any stored copies of the data depending on the type of request made by SLC 108A. This is discussed further below.

PND 102A also snoops the request from SLC 108A. PND 102A determines whether shared cache logic 106A stores the most recent copy of the requested data. If so, the data will be provided by PND 102A to SLC 108A.

In some instances, data requested by IP 110A is not resident within any of the cache memories associated with processor bus 104A. In that case, PND 102A must forward the request to SCD 100. SCD 100 determines the location of the current copy of the requested data using information stored within its directory 101. The most current copy may reside within the SCD itself. If so, the SCD provides the data directly to PND 102A.

In some cases, requested data is stored within a cache memory of a different processing node. In this instance, the way in which the request is handled depends on the type of request made by IP 110A, and the type of access rights that have been acquired by the other processing node. If IP 110A is requesting "ownership" of the data so that a write operation can be performed, and further if another processing node 120 currently retains ownership of the data so that updates can be made with that other node, the SCD issues a "port snoop and invalidate" request. This request will cause the processing node that retains the data to invalidate any stored data copies, and return updated data to SCD 100 so that this updated copy may be forwarded to PND 102A.

In another situation, IP 110A may be requesting ownership of data that is retained with read-only access rights by one or more other processing nodes 120. In this situation, an invalidation request is issued to these one or more processing nodes. An invalidation request causes a processing node to invalidate its copies of the data so that the data may no longer be used.

In still another scenario, IP 110A may be requesting read-only access to data that is retained with ownership privileges by another node. In this case, SCD 100 issues a "port snoop" request to the other processing node. The other node may relinquish all access rights when returning the data, or, in some instances, may retain a read-only copy. The determination of whether to retain a read-only copy is largely beyond the scope of the present invention.

In any of the foregoing scenarios, SCD 100 issues an appropriate request to one or more target processing nodes 120. Each request is received by the PND of each of the target processing nodes. In response to such a request, the PND may issue a request on the respective processor bus 104 to prompt return of any modified data. Based on the particular scenario, this request may also result in invalidation of the stored copy, or the conversion of that copy to read-only data. Any updated data will be returned to SCD 100 so that it can be forwarded to the requester.

In addition to read requests as discussed above, an IP such as IP 110A may further issue a write request to store data to one of its dedicated caches. Data within these caches is eventually flushed or aged to the corresponding shared cache within the PND. In turn, data may be flushed or aged from the shared cache to be stored back to SCD 100.

Figure 2:
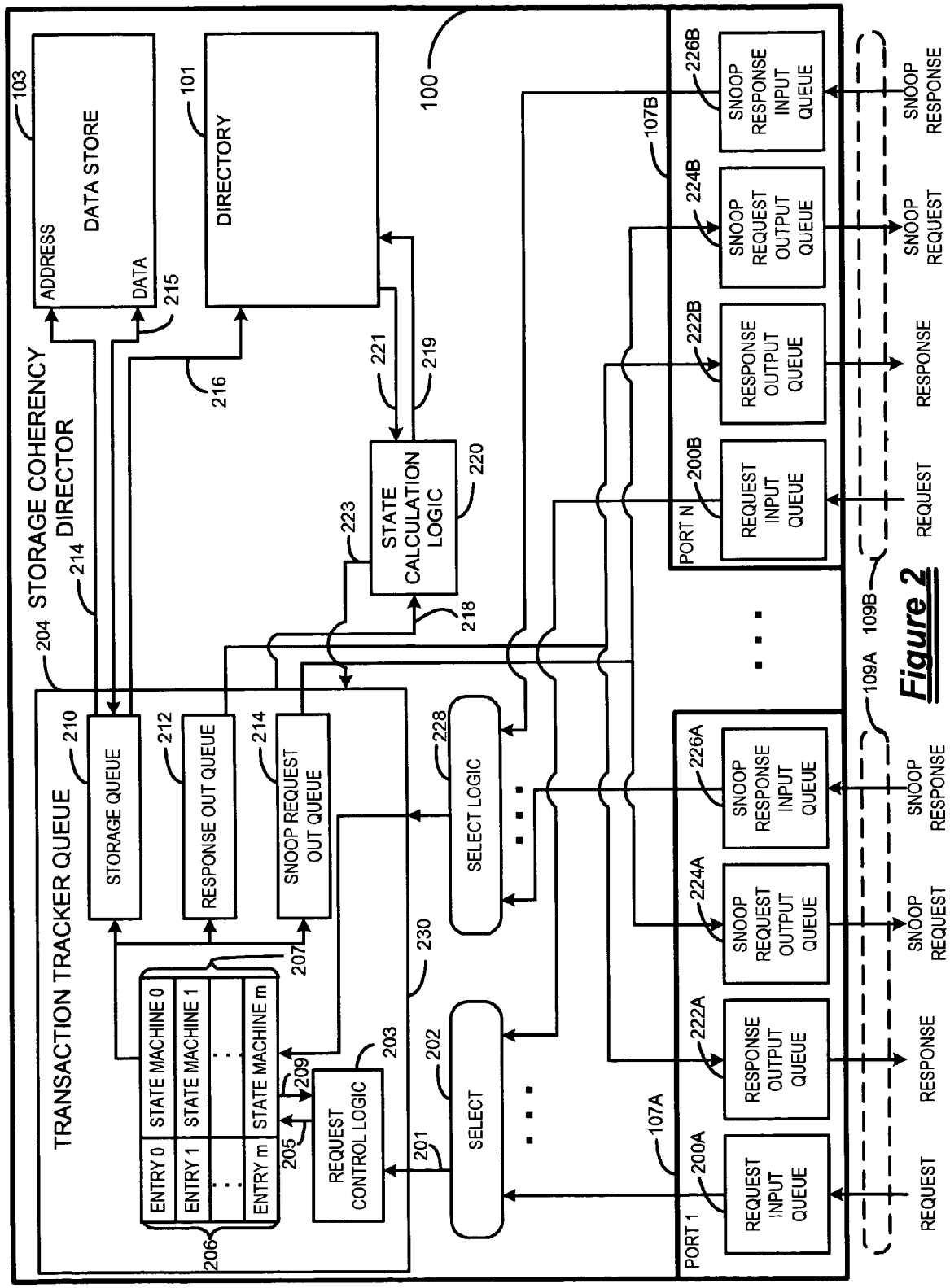
FIG. 2 is a more detailed view of the Storage Coherency Director.

The way in which various read and write requests are handled within a system such as is illustrated in FIG. 1 may further be considered in reference to FIG. 2.

FIG. 2 is a more detailed view of SCD 100. As discussed above, each processing node 120 is coupled to the SCD via a high-speed interface (shown dashed). Interface 109A connects processing node 120A to port 1, 107A of SCD 100. Similarly, interface 109B couples processing node 120B to port N, 107B, of the SCD. Each of these interfaces includes, but is not limited to, request, response, snoop request and snoop response lines.

Each of the ports includes a respective request input queue. Any read, write, or other type of request from a processing node is provided across a respective high-speed interface 109 and is stored within the request input queue of the corresponding port. For example, a request that is provided by processing node 120A over interface 109A will be stored temporarily in request input queue 200A of port 1, 107A. Similar queues are included within each port. Each request input queue is capable of storing multiple requests that are waiting to be processed by SCD 100.

The request input queues may each provide a stored request to select logic 202. Select logic includes logic that selects one of the pending requests based on a fairness algorithm. In one embodiment, a round robin approach is employed. Any other fairness mechanism may be used in the alternative to serialize the requests that may be received in parallel from the multiple ports. The selected request is then transferred on interface 201 to request control logic 203. This control logic controls the transfer of requests on lines 205 to Transaction Tracker Queue (TTQ) 204 in accordance with the current invention. In one embodiment, request control logic 203 transfers a new request to TTQ 204 each clock cycle.

TTQ 204 includes entries 206, each of which is capable of storing a request. Each entry is associated with a respective one of state machines 0 through m 207. Each state machine processes the request stored within the associated request entry.

Each of the state machines 207 is coupled to several queues, shown as storage queue 210, response out queue 212, and snoop request out queue 214. When a new request is stored within TTQ 204, the respective state machine is activated to track processing activities and to control the use of these TTQ queues for that request.

Upon activation of a state machine for a request, the state machine logic generates a request entry within storage queue 210 that includes a request address and request type. If the request is a write-type request, write data may be provided via interface 109 along with the address for storage in the request entry. In an alternative embodiment that utilizes a "split transaction" interface that provides an address and associated write data via interface 109 during two separate transfer operations, the data will eventually be stored in the request entry along with the associated address. For example, data may be matched with the address using a transaction identifier that accompanies both the data and the address.

In either of the foregoing embodiments, the storage queue processes request entries in a First-In, First-Out (FIFO) manner. When a request gains priority, the request address and any data are provided to data store 103 on lines 214 and 215, respectively. Also at this time, the request address is provided on lines 216 to directory 101.

When a request is provided to data store 103, a full cache line of data will be read from, or written to, data store based on the request type. In the mean time, the address on lines 216 reads the cache line state information for the addressed cache line from directory 101. As discussed above, this state information indicates the location and state of the most recent copy of the associated cache line.

The state information is provided to state calculation logic 220 on lines 221, and is thereafter forwarded to TTQ 204 on lines 223 for use in fulfilling the request. This cache line state information is further used by state calculation logic 220 to determine the next cache line state for the cache line based, in part, on the request type provided by TTQ 204 on lines 218, and on the state information read from directory 101. State calculation logic 220 then writes the updated cache line state back to directory 101 on line 219.

TTQ 204 uses the request type of the current request along with state information stored within directory 101 to determine whether a snoop request is necessary to fulfill the current request. For example, when the request is a write request or some other type of request that stores data to data store 103, a response may be issued to the requester without having to issue a snoop request. This response indicates the write operation has completed successfully. In another scenario, a snoop request is unnecessary when read-only access is requested and the most recent copy of the cache line is stored in the SCD, or one or more other PNDs retain the data in a read-only state. In another case, a response may be returned to the requesting processing node when a cache line is to be returned with write-access privileges, and the SCD owns the cache line. In still another scenario, the requested cache line may be returned without the issuance of a snoop request if the directory state indicates that cache line is already owned by the requesting processing node. This latter situation may occur, for example, if the requesting node had previously obtained the cache line in the exclusive state, had never modified it, but instead had invalidated it without notifying the SCD.

When it is determined that a response may be returned to the requesting processing node without issuing a snoop request, TTQ generates the response using the cache line state information. This response includes the original transaction identifier that was provided with the request, any requested data, and a response type. If data is returned, this response type indicates the access rights that are provided with the data. This response is stored within response out queue 212, and will be transferred to the appropriate port so that it may be forwarded to the processing node that initiated the request. In the current example, the response is transferred to response output queue 222A of port 1 107A. This request is then forwarded to processing node 1, 120A, when it gains priority.

After a response has been queued within the appropriate one of the response output queues and any memory updates have occurred, the respective one of the state machines indicates that the request processing is completed. The request is removed from the entry within TTQ 204 such that another request may be received in its place.

As noted above, in some cases, a snoop request must be issued to another processing node before a response may be issued to the requester. This occurs, for example, when the SCD cannot return the cache line in the required state. For example, if the request type indicates that the cache line should be returned with write-access privileges, and if a valid copy of the cache line resides within another processing node, a snoop request must be generated. This request is issued to invalidate the cache line copy residing within that other processing node, and to prompt the return of any modified data.

If a snoop request is necessary, TTQ 204 generates the request, which is stored within snoop request out queue 214. This request includes a transaction id generated by TTQ 204, a snoop request type, and an address. The request is transferred to the snoop request output queue(s) of the appropriate port(s) based on the processing node(s) that have a copy of the requested cache line. In the current example, it will be assumed that processing node N 120B owns the requested cache line. The snoop request is therefore transferred to snoop request output queue 224B of port N 107B. A similar queue is provided for each of the other ports. This request is transferred to PND 102B to be processed in the manner discussed above.

Eventually, processing node N 120B will return a snoop response to snoop response input queue 226B of port N 107B. This snoop response is provided to select logic 228, which selects one of the pending responses for presentation to TTQ 204 using a rotational fairness algorithm. The selected snoop response will be assigned to the state machine that is still processing the initial request using the transaction id that was included with the snoop request and returned with the snoop response.

After the snoop request is provided to the appropriate one of state machines 207 within TTQ 204, it may be used to immediately generate a response to the requester. This is possible if the snoop response returned data, and if the response type can be determined without another reference to directory 101. If this is the case, the state machine generates a response that is stored within response out queue 212. This response includes the cache line data returned from port N 107B along with a response type indicating the state of the cache line. This response will be transferred to the response output queue 222 of the appropriate port in the manner discussed above. In the current example, the response is transferred to response output queue 222A of port 1, 107A, so that it can be forwarded to processing node 1, 120A.

In addition to generating a response to the requesting processing node, the state machine further generates a request entry within storage queue 210. This request, which will be processed on a FIFO basis as discussed above, will store the updated data returned from processing node 120B to data store 103. This request entry within storage queue 210 will also initiate a read operation to read the cache line state information from directory 101 onto lines 221. State calculation logic uses the current cache line state information as well as the request type and the snoop response type provided by TTQ 204 on lines 218 to update the cache line state information. The updated cache line state information is stored back to directory 101 on lines 219.

After the modified data has been stored to data store 103 and the cache line state information has been updated, the original request is removed from TTQ 204. This allows TTQ 204 to receive another request from one of the ports based on the fairness algorithm practiced by select logic 202.

The foregoing paragraphs assume that data was returned with the snoop request. This will only occur, however, if a processing node that had ownership of the cache line had actually modified the cache line data. In all other instances in which the cache line was not modified, the snoop response will only return ownership, or, if the cache line had been retained in the shared state, indicate that invalidation had been completed. In this case, the response can only be fulfilled after the data is retrieved from data store 103. Therefore, an entry is generated within storage queue 210. When the request entry gains priority, the requested cache line is read from data store 103 on lines 215, and is used by the associated state machine to generate a response in response out queue 212.

When the response has been generated within response out queue 212, it is transferred to response output queue 222A to be provided to processing node 120A in the current example. The request processing is then considered complete, and the request may be removed from TTQ 204 so that another request may be received.

The above discussion provides an overview of one embodiment of a multi-processor system. As may be appreciated from this discussion, within this type of system, many different requesters may be attempting to gain access to a shared resource such as SCD 100 at any given time. For example, each IP within the system may be attempting to simultaneously read data from, or write data to, SCD 100. Similarly, read and/or write requests may be issued to the SCD from the I/O modules 111A and/or 111B. Moreover, because the system of FIG. 1 may include many more processing nodes and/or I/O modules than are illustrated, demands on any given shared resource may far exceed the number of requests that can be handled by, or even queued to, that resource at a given time.

In large data processing systems such as that exemplified by FIGS. 1 and 2, some system is needed to manage a large number of simultaneous requests to a shared resource such as SCD 100. This system must throttle the issuance of the requests since, generally, only a limited number of requests can be queued to the resource at once. Second, this system must ensure that all requesters are allowed to eventually gain access to the resource. Otherwise, a "live-lock" situation may occur wherein requests from one or more requesters are never processed, thereby affecting operations of the entire system. Ideally, this system further limits the number of requests queued to a given resource so that queuing latency does not exceed acceptable thresholds. The current invention provides a system and method to address these issues. Before considering the specific logic used to implement one embodiment of the current invention, several concepts associated with this invention are discussed.

Figure 3:
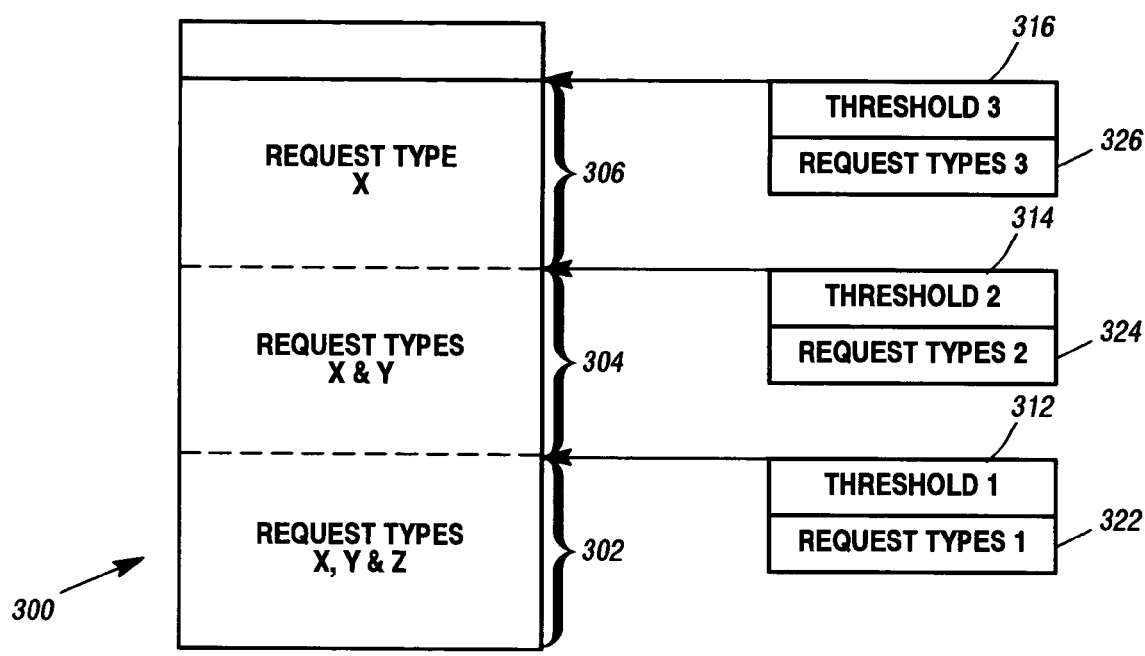
FIG. 3 is a block diagram conceptually illustrating one aspect of the present invention.

FIG. 3 is a block diagram conceptually illustrating one aspect of the present invention. Block 300 represents the total number of resources available in the SCD to receive and store requests from requesters, including PNDs 102 and I/O Modules 111. For example, in the embodiment discussed above, these resources include sixteen TTQ entries, each of which is associated with a respective state machine. Each entry is available to receive a request. Therefore, block 300 represents these sixteen entries and associated state machines. It will be appreciated that this maximum number is somewhat arbitrary, and may be selected to be greater or less than this number in another embodiment.

The maximum number of resources available to receive requests, as represented by block 300, includes three sub-divisions 302, 304, and 306. Each of the three sub-divisions represents the way in which the total number of resources available within TTQ will be allocated. This allocation will be based on request types. For example, sub-division 302 represents the total number of resources that are available for requests of any type. For discussion purposes, these request types include types X, Y, and Z. A second subdivision 304 is allocated to store requests that, in one embodiment, are of types that represent a subset of the types retained by subdivision 302. In this example, the requests retained within subdivision 304 are shown as being limited to types X and Y. Finally, a third subdivision 306 is allocated to a subset of the types retained by subdivision 304. This subset is shown to be limited to request type X.

Before continuing, it should be noted that the representation of FIG. 3 is not intended to indicate any spatial orientation of requests as they may be stored within TTQ. For example, FIG. 3 is not intended to depict that requests of types Z will always be stored within a particular range of TTQ entries. Instead, this representation is intended to depict the number of requests of particular types that may be stored within entries of the TTQ at a given time.

As may be appreciated from the foregoing, the maximum number of requests of type X that may be stored within TTQ 206 is limited to the number of TTQ entries represented by subdivisions 302, 304, and 306. The maximum number of requests of type Y that may be retained within TTQ is limited to the number of TTQ entries represented by subdivisions 302 and 304. Similarly, the maximum number of requests of type Z retained within TTQ is limited to the number of TTQ entries represented by subdivision 302.

According to the current invention, the size of subdivisions 302, 304, and 306 is determined by respective programmable threshold values shown as "threshold 1" 312, "threshold 2" 314, and "threshold 3" 316. In one embodiment wherein the maximum number of TTQ entries is "sixteen", threshold 3 may be programmed to a predetermined number less than the TTQ depth such as "fifteen". This allows the queue to be compressed so that fewer requests are pending at a given time. This may be desirable for performing system testing, or may be used to reduce the overall latency associated with any given request. In the embodiment shown, a value is selected for threshold 2 314 that is less than threshold 3, and threshold 1 312 is selected to be less than threshold 2.

In another embodiment of the invention, the types of requests associated with a given subdivision 302, 304, and 306 are selectable using programmable request type designations shown a "request types 1" 322, "request types 2" 324, and "request types 3", 326, respectively. For example, these programmable values may be implemented using a master-bitted value, with each bit representing a respective request type. This allows the maximum number of requests of each request type stored within TTQ to be adjusted by modifying the request types associated with each of the subdivisions, as well as by modifying the size of each subdivision. In the current example, "request types 1" would be programmed to include types X, Y, and Z. Similarly, "request types 2" would be set to include types X and Y, and so on.

Application of the concept of FIG. 3 can best be understood by example. Assume that TTQ 204 is empty and the system is enabled to begin receiving requests of any of type. Assume, further, that threshold 1 is set to "five", threshold 2 is set to "ten", and threshold 3 is set to "fifteen". After five requests of any of the types X, Y, and Z are received, the first threshold is reached. Assuming these five original requests remain stored within TTQ, five additional requests of types X and Y may be received before the threshold 2 of "ten" is reached. Thereafter, assuming no requests are removed from TTQ 204, five additional requests of type X may be received before threshold 3 is met. Thereafter, no more requests are allowed entry into TTQ 204 until some of the previously received requests have been removed from the TTQ.

It will be appreciated that the embodiment of FIG. 3 is merely exemplary. TTQ 206 may be associated with more, or fewer, than three sub-divisions. Additionally, more or fewer than three different request types may be accommodated by the system. With the conceptual aspects of the foregoing mechanism available for discussion purposes, use of this aspect of the invention within a system such as that shown in FIGS. 1 and 2 is now considered.

Figure 4:
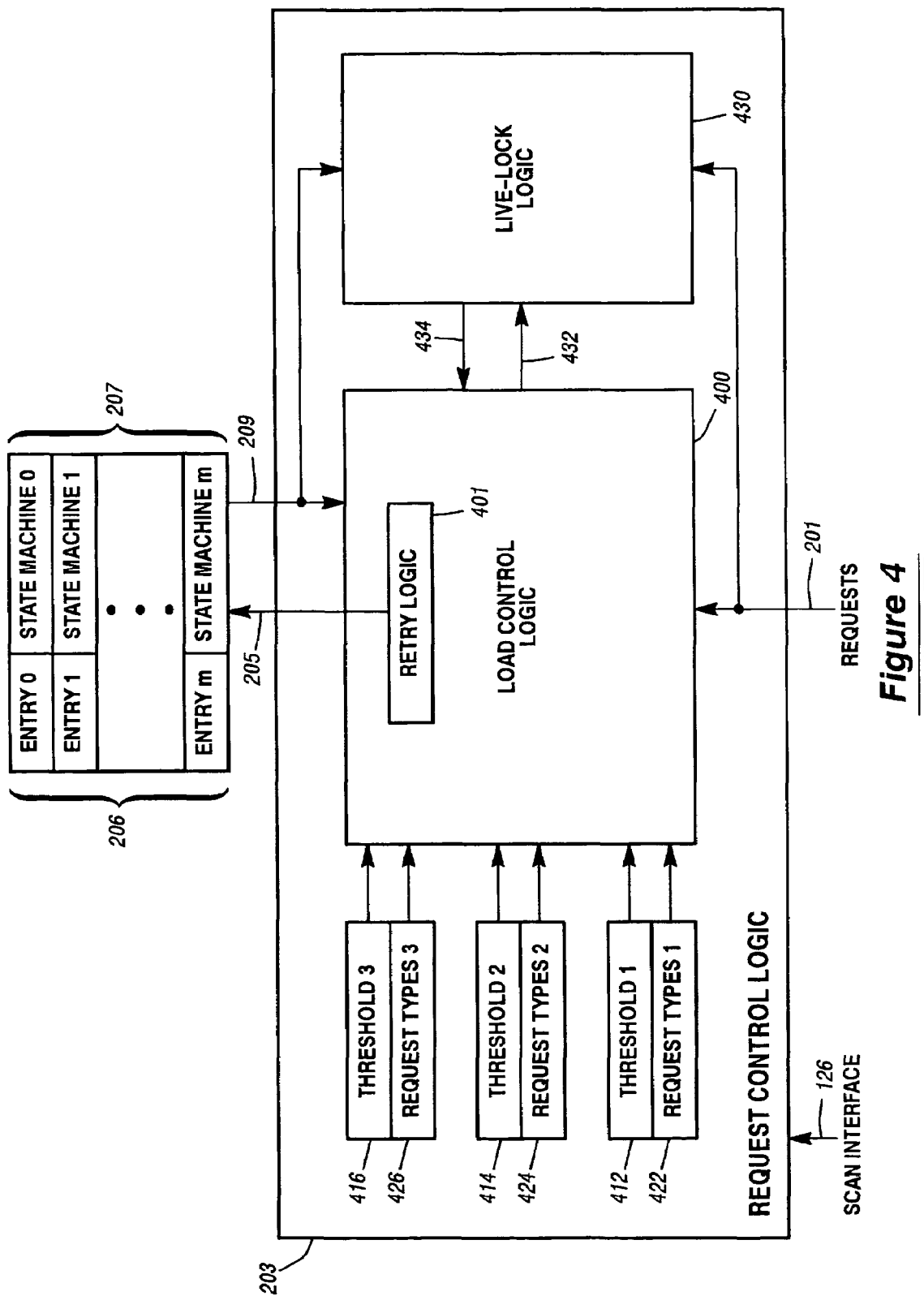
FIG. 4 is a block diagram of request control logic of FIG. 2.

FIG. 4 is a block diagram of request control logic 203 of FIG. 2. Requests received on interface 201 from select logic 202 are provided to load control logic 400. Load control logic further receives input from programmable storage devices 412, 414, and 416, which store threshold 1 312, threshold 2, 314, and threshold 3, 316, respectively. In one embodiment, load control logic 400 further receives input from programmable storage devices 422, 424, and 426, which store request types 1, 322, request types 2, 324, and request types 3, 326, respectively. Storage devices 412–416 and optional storage devices may be programmed via scan engine 124 and scan interface 126.

Each request received by load control logic 400 includes a request type. This type may indicate, for example, whether the request is a read or a write request. Other types of requests are possible. Each request further includes an indication as to which of the requesters issued the request. In one embodiment, the requester is indicated as being one of the PNDs shown to include PND 102A and 102B of FIG. 1, or an I/O module 111. It will be understood that in a larger system, many more PNDs and I/O modules may be coupled to SCD 100 in the manner shown. In another embodiment, the requester could be identified as one of IPs 110 or one or more other types of units.

When load control logic 400 receives a request, the request type included with the request is used along with the threshold values stored in the programmable devices to determine how the request is to be handled. In one embodiment that does not include programmable type values, this determination will be made using the programmed threshold values. For example, returning to the example provided above, in an embodiment that does not include programmable request types 322, 324, and 326, load control logic 400 may be designed to always use threshold 1 314 to determine how a request of type "Z" will be handled. In another embodiment wherein the mapping of request types is performed using the programmable request values, the handling of requests of type "Z" to a threshold value will be controlled not only by a threshold value, but also by the request type stored in programmable device 422.

After load control logic 400 determines how a particular request is to be handled, that request is provided on lines 205 to be stored in an available one of entries 206. The request is provided with an indication as to how the respective one of state machines 207 is to process the request. After the request is handled in the indicated manner, a response to the request will be stored within response out queue 212 in the manner discussed above. When the response is issued to the requester, the request is removed from the TTQ entry and request processing is considered complete. At this time, the state machine processing the request provides an indication on lines 209 as to the type of response that was issued, and identity of the request that was removed from entries 206. Load control logic 400 uses this information to track the number of requests of each request type that are stored within entries 206 so that a determination can be made as to how to process newly received requests. Load control logic 400 also tracks the availability of the various TTQ entries so that an appropriate entry can be selected during the loading of a next request.

The system of FIG. 4 can best be understood by considering the manner in which various types of requests are processed within a system such as shown in FIG. 1. As discussed above, when read request are issued by a PND 102 to SCD 100, these requests may be handled relatively expeditiously if SCD 100 stores the most recent copy of the requested data. The data can be retrieved from data store 103 and provided to the requester in a manner that is not dependent on another processing node. If, however, SCD must issue a snoop request to obtain the data, the request may take a relatively long time to complete. Thus, the time required to complete a read request may vary widely based on where the latest copy of the requested data resides.

In contrast to read requests, write requests can be completed in a manner that is not dependent on the actions of a processing node. That is, data that is provided by a PND 102 to SCD 100 during a write request is stored to data store 103 when the request gains priority. An acknowledgement is then issued to the requester indicating the write operation has been successfully completed. The time required to complete the request is primarily dependent upon which other requests are stored within TTQ 206, but is not dependent on the issuance or completion of a snoop request.

The processing of read and write requests can, in some instances, be interdependent. For example, a read request may be delayed because of the occurrence of a previously issued write request for the same data. This occurs as follows. Assume that PND 102B issues a read request for data to SCD 100. Directory 101 is referenced, indicating that IP 110A retains a possibly updated copy of the data. SCD 100 therefore issues a snoop request to PND 102A soliciting the return of data and access rights.

Next assume that sometime prior to the receipt of the snoop request by PND 102A, the requested data was returned to SCD 100 by PND 102A during a write request. This could occur, for example, because IP 110A no longer required access to the data. PND 102A tracks this write request until the associated acknowledgement is received indicating the write request has been completed successfully.

When PND 102A receives the snoop request for the data, the PND determines the requested data is associated with a write request for which the acknowledgement remains outstanding. In this type of situation, the PND will not respond to the snoop request until the acknowledgement for the write request is received. If this limitation were not imposed, PND 102A could issue a snoop response indicating that the data is no longer present within processing node 102A. This snoop response could by-pass the pending write request, as is possible in a memory system employing dual virtual channels, with one channel being provided for the issuance of requests, and another channel being used for providing responses. This type of dual virtual channel configuration allows certain types of transactions to by-pass other pending transactions. The way in which this occurs is largely beyond the scope of the current invention. What is important to note is that if the snoop response by-passes the write request, outdated data may be retrieved from SCD 100 and returned to PND 102B, resulting in processing errors.

For the foregoing reason, a PND 102 will not respond to a snoop request if a write request for the same data is underway. Once an acknowledgement is received indicating the write operation has completed, the PND will respond to the snoop request in a manner that indicates the requested data has already been returned to the SCD. Upon receipt of this indication, the SCD will retrieve the updated data from data store 103 for return to the requester.

As can be appreciated from the foregoing, some read requests that necessitate snoop requests could be even more time consuming to complete than would otherwise be the case. This is true if the requests are dependent upon the completion of a write request.

With the foregoing description of request types available for discussion purposes, the use of a mechanism such as shown in FIGS. 3 and 4 may be considered within the context of a system such as illustrated in FIGS. 1 and 2. In one embodiment of the invention, it is desirable to limit the number of read requests being processed by TTQ 204. This is because these types of requests may take longer to complete than write requests. Additionally, as discussed above, the completion of read requests may require the issuance of snoop requests. The time required to complete a given snoop request depends not only on the request traffic and workload associated with the target processing node, but may further depend upon the completion of a write request issued by that processing node.

For all of the foregoing reasons, it may be desirable in the exemplary system to limit the number of read requests in progress within TTQ 206. This may be accomplished by associating read requests only with threshold 1, and not with thresholds 2 or 3. For example, in one embodiment, both read and write requests are associated with threshold 1. Additional types of requests may be associated with threshold 1 in a manner to be discussed further below. This association may be implemented in a manner that is "hardwired" by the design of load control logic 400. Alternatively, requests may be associated with this threshold using a programmable value stored within storage device 422.

Next, recall from the above discussion that the completion of write requests is dependent on the workloads within the SCD 100, and is not affected by the workload in other parts of the system. These requests may be completed in a time that is relatively short as compared to the time required to complete some read requests. Additionally, it is important to ensure that processing of write requests is completed as efficiently as possible, since the completion of some of these requests may affect the completion of pending snoop requests that are issued during the processing of read requests. For these reasons, more TTQ space is allocated to the processing of these types of requests by associating threshold 2 in storage device 414 with write requests. This association may be completed in a hardwired manner, as discussed above, or using a programmable value stored within storage device 424. Additional types of requests may be associated with threshold 2 in a manner to be discussed further below.

When using thresholds 1 and 2 in the above-described manner, load control logic 400 will continue to provide read requests to TTQ for processing so long as the number of read, write, and any other types of requests associated with threshold 1 does not exceed threshold 1. In other words, so long as the total number of in-progress requests that are of one of the types associated with threshold 1 does not exceed the number indicated by threshold 1, read requests can be provided to TTQ for processing.

Returning to FIG. 3, the current example may be considered conceptually as follows. Both read and write requests may be stored in the portion of the TTQ entries represented by subdivision 302. However, as between read and write requests, only write requests may be stored in the TTQ entries represented by subdivision 304. Thus, the maximum number of write requests that may potentially be in progress within TTQ is greater than the maximum number of read requests that may be in progress.

Next, consider the situation wherein a large number of requests are being received by request control logic 203. As a result, threshold 1 has been reached. That is, valid requests are stored within a number of TTQ entries represented by subdivision 302 of FIG. 3. When this occurs, load control logic 400 begins utilizing a throttling mechanism involving the issuance of retry responses to read requests. When this mechanism is used, retry logic 401 provides a read request to an available one of entries 206 along with an indication that the request is to be retried. The corresponding one of state machines 207 generates a retry response for this read request that is stored to response out queue 212. When this response is issued to the requester, the request is considered complete, and is removed from the TTQ entry. When a PND receives a retry response, the associated read request is retained by the PND a predetermined period of time, and is then re-issued to SCD 100. According to the current embodiment, only read requests are retried in this manner, since write requests may be completed relatively expeditiously, and do not depend upon the potential issuance of a snoop request. In another embodiment, other types of requests may be retried in addition to, or instead of, read requests.

The retry procedure described above can be completed in a relatively short period of time. Thus, an entry that receives a read request for which a retry response will be issued will be freed in a relatively short period of time to receive another request.

In one embodiment of the invention, thresholds 1 and 2 are associated with those read requests that are to be retried in the manner discussed above. Returning to FIG. 3, this means that the TTQ entries represented by subdivision 304 are available to receive both write and retried read requests, wherein the entries illustrated by subdivision 302 are available to receive read, write, and retried read requests.

According to the exemplary embodiment described above, threshold 3 may also be associated with both write requests and retried read requests. As a result, TTQ entries represented by subdivisions 302, 304, and 306 are available to receive these types of requests. The reason for defining two different thresholds associated with both write and retried read requests will become apparent from the following discussion. As discussed above, the threshold associated with subdivision 306 may be selected as including fewer than all TTQ entries if the TTQ size is to be compressed.

The foregoing mechanism uses retry responses to throttle the flow of requests from PNDs. Retry techniques allow for concurrent parallel transaction processing which will generally provide good performance for high throughput multi-processor systems. At the same time, retry techniques prevent deadlock scenarios that can be associated with parallel processing systems. However, such mechanisms may lead to the unwanted occurrence of "live-lock" situations. A live-lock situation involves the improbable but possible scenario wherein requests from one requester are continually retried and are therefore prevented from making progress. This can be especially problematic if the requester that is not gaining access to the shared resource must make progress before requests from other requesters can be completed.

One example of the type of scenario described in the foregoing paragraph involves the use of software lock cells. A lock cell is a variable that is used to control a software-lock to an associated shared resource such as shared memory data. The state of the lock cell indicates whether the software-lock and the associated, protected shared resource is currently activated by a software process, or "thread", that is executing on another processor. Generally, a thread activates the software-lock using a lock-type instruction. As is known in the art, this type of instruction first tests the state of the lock cell. If the state of the lock cell indicates the shared resource is available, the instruction then sets the lock cell to activate the software-lock to the executing thread. These test and set functions are performed during an indivisible operation by a single instruction to prevent multiple processors from inadvertently gaining simultaneous access to the same lock cell.

Lock cells will often be used by one processor that is updating a shared area of memory with data that is needed by another processor. Thus, if the first processor cannot gain access to the lock cell, processing performed by one or more other processors may be affected.

To prevent a live-lock situation such as that described above, the current invention provides a live-lock prevention mechanism implemented by live-lock logic 430. The live-lock prevention mechanism of the current invention operates generally as follows. When load control logic 400 provides a read request on lines 205 to entries 206 along with an indication that the request must be retried, request information is also provided on lines 432 to live-lock logic 430. This information indicates the identity of the requester, which in this case will be one of the PNDs 102. If this is the first time a read request from the requester is being retried, live-lock prevention logic records the identity of the requester. Thus, live-lock logic 430 maintains a record of all requesters that have issued a read request that has been retried.

After a requester has received a retry response from SCD for at least one read request, the next read request issued to SCD may be granted an elevated status. This occurs because live-lock logic 430 elevates the status of requesters associated with a retry response on a rotating basis. After a requester is granted elevated status, the next read request issued by that requester is considered high-priority and will be loaded into an available TTQ entry. According to one embodiment of the invention, these types of high-priority read requests are associated with thresholds 1 and 2 stored in storage devices 412 and 414, respectively. Using this scheme, read, high-priority read, retried read, and write requests may be stored within TTQ entries represented by subdivision 302 of FIG. 3. High-priority read, retried read, and write requests may be stored within TTQ entries represented by subdivision 304 of FIG. 3. Retried read and write requests are stored within the TTQ entries represented by subdivision 306. This scheme was selected to optimize processing within the exemplary data processing system architecture. Any other type of scheme may be employed in the alternative to optimize a different architecture.

Figure 5:
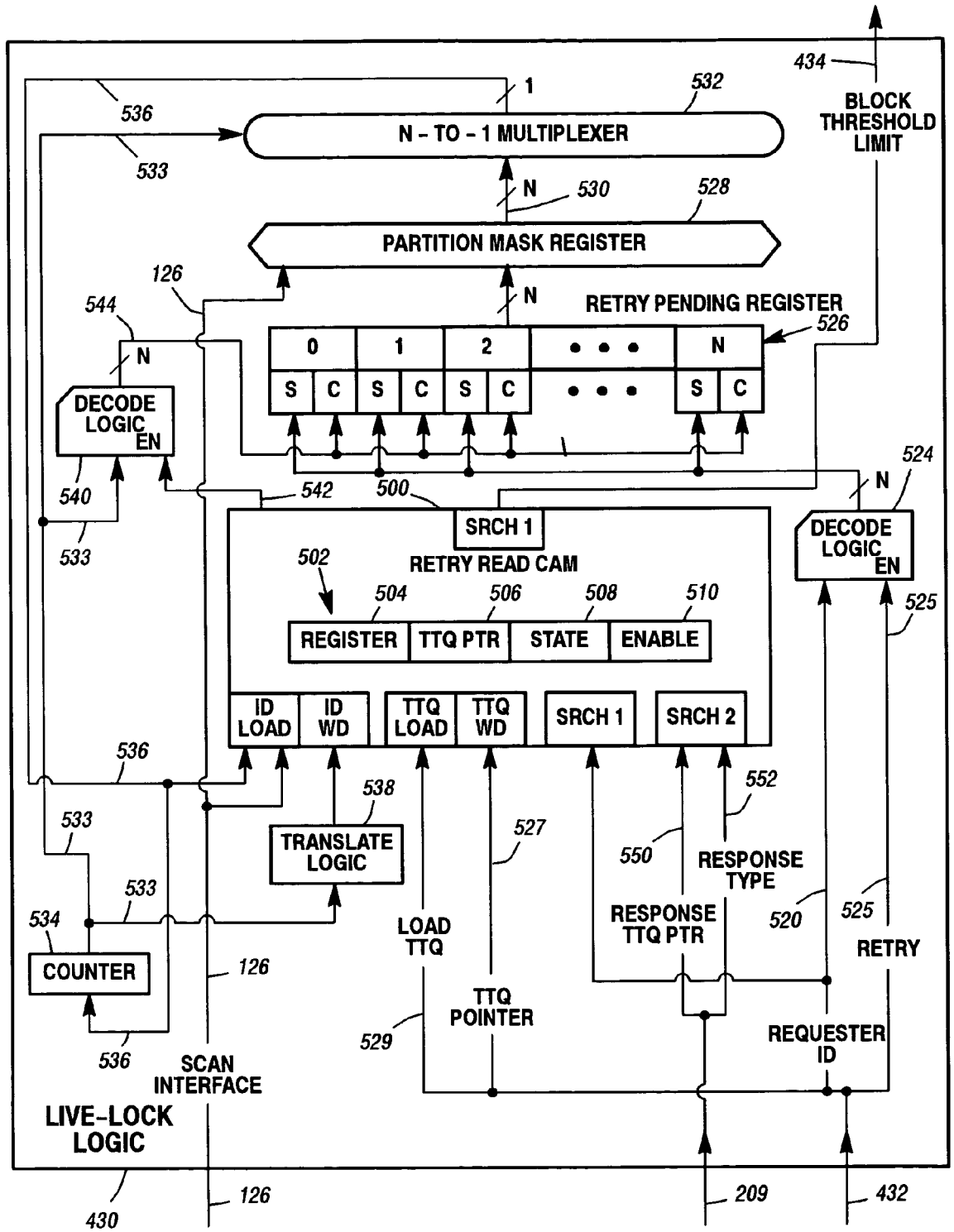
FIG. 5 is a block diagram of live-lock logic according to one embodiment of the current invention.

FIG. 5 is a block diagram of live-lock logic 430 according to one embodiment of the current invention. This logic includes a retry read Content Addressable Memory (CAM) 500 to store information about one or more read requests that are considered high-priority. Each request is stored within a CAM entry 502 that includes multiple fields. A requester ID field 504 identifies which of the PNDs issued the request. A TTQ pointer field 506 stores a pointer to a TTQ entry that will receive the request when request processing is initiated. State field 508 stores the state of the CAM entry, as will be discussed below. An enable field 510 is set to a predetermined state to enable that entry for use. The retry read CAM may be compressed by disabling one or more entries using this enable field. In one embodiment, CAM includes four entries, although more or fewer entries may be provided in another embodiment.

Operation of the retry read CAM 500 can best be understood by example. As discussed above, when a read request has been received by load control logic, information concerning that request is provided on lines 432 to live-lock logic 430. This information will include a retry signal 525 indicating whether load control logic has determined that threshold limits have been reached and the request must therefore be retried. This information further includes a requester ID that identifies the requester. In one embodiment, this requester ID will identify one of the PNDs 102, one of the I/O modules 111, or one or more maintenance modules that will include a scan engine such as scan engine 124. Other types of requesters may be identified by the requester ID.

The requester ID is provided on lines 520 to decode logic 524. Decode logic 524 is enabled by the retry indication provided on line 525. Decode logic decodes the requester ID, and the decoded value will be used to set a corresponding one of the bits 0 through N that are stored within retry pending register 526. In this manner, a respectively associated bit within retry pending register 526 is set to record which requester is associated with a currently pending read request that has been retried at least once. In one embodiment, retry pending register includes thirty-two bits, although more or fewer bits may be provided to track a different number of requesters.

While a bit is being set within retry pending register 526 for the requester, load control logic 400 also provides the request to a TTQ entry 206. As discussed above, this request will be handled in a manner that is determined by the request type as well as whether an applicable TTQ threshold value has been reached, as discussed above. In the current example, load control logic 400 has determined that the current read request must be retried. Therefore, the corresponding one of state machines 207 will generate a retry response to the requester. This requester must reissue the read request later.

After one or more bits are set in retry pending register 526 of live-lock logic 430, the bits are processed so that one of the requesters associated with an activated retry bit will be granted an elevated status as follows. All bits within retry pending register 526 are provided to a partition mask register 528. The partition mask register masks certain ones of the bits of the retry pending register 526. This functionality is provided in an embodiment that allows the system of FIG. 1 to be partitioned into multiple "processing partitions".

As is known in the art, large-scale data processing systems often provide the capability to create multiple processing partitions, each comprised of processors and other system resources that have been logically and physically grouped to execute tasks independently of any other processing partition. The partitioning ability allows various system resources to be assigned to user groups and tasks in a manner that increases overall system efficiency.

In one embodiment of the invention, the main memory is one of the resources that may be partitioned. As discussed above in reference to FIG. 1, the main memory capability of the system is provided by one or more SCDs, each including a predetermined portion of the overall memory range. All SCDs may be added to the same partition, or one or more SCDs may be included in a first partition while one or more other SCDs are added to another partition. In yet another scenario, the SCDs may be distributed between more than two partitions.

When multiple partitions are defined, an SCD only processes requests directed to the address range that is supported by that SCD and that are issued by the one or more requesters that are included within the same partition as the SCD. Therefore, partition mask register 528 of FIG. 5 is programmed with a value that masks out all of the bits from the retry pending register that correspond to requesters that are not included within the current processing partition. The partition mask register can be programmed using scan interface 126 at initialization time, or any time thereafter as the system is re-configured so that only the requesters within the current partition are being tracked for retry purposes.

After partition mask register 528 masks all bits from the retry pending register that are associated with requesters that are not in the current partition, only the valid bits remain activated on lines 530. These bits are provided to an N-to-1 multiplexer 532. This multiplexer is controlled by a count value on lines 533 that is provided by counter 534. Counter increments at predetermined time intervals to select successive ones of the signals on lines 530. The incrementation continues until an activated bit is encountered on line 536, thereby disabling the counter so that counting is temporarily discontinued.

In addition to disabling counter 534, an activated signal on line 536 also enables retry read CAM 500. If an entry is available within retry read CAM to receive a requester, this entry is allocated to the requester that is associated with the selected bit of retry pending register 526. Translate logic 538 obtains the identity of this requester by translating the count value on lines 533 to the requester ID. This requester ID is stored within requester ID field 504 of the newly allocated entry.

When the requester ID is loaded into CAM entry, the state field 508 is also updated. In one embodiment, the state field stores a two-bit value that defines the following states:

00 Available entry;

01 Source ID valid/TTQ pointer invalid;

10 Illegal Code value; and

11 Source ID valid/TTQ pointer valid.

When a source ID is loaded into an available CAM entry, state field 508 transitions from the available state of "00", to the source ID valid/TTQ pointer invalid state of "01". This indicates a valid requester ID has been loaded within field 504, but a TTQ pointer has not yet been loaded within TTQ pointer field 506.

When the requester ID is loaded into an available CAM entry, the corresponding bit for this requester is cleared within retry pending register 526. This operation is performed by decode logic 540, which is enabled by signal 542 activated when the requester ID field 504 of the CAM entry is created. The decode logic decodes the count value on lines 533, and generates the signals on lines 544 to clear the appropriate bit. This re-enables counter to begin the search for the next valid activated bit in the manner described above.

After an entry has been created within retry read CAM 500 for a given requester, the requester is considered to be a high-priority requester. The next read request received from this requester will be granted an elevated status. This can best be understood by continuing the current example.

Returning to the current example, assume that the requester that issued the previously retried read request has issued another read request to the SCD. In one embodiment, this request must the same request as was previously issued, and which is now being retried. In an alternative embodiment, this request may request data from a different address, and may be initiated by the same or a different IP 110 or I/O module 111 as was provided the retry response. In either case, the PND that is issuing the request must ensure that each transaction that is retried eventually makes forward progress so that a live-lock situation does not occur with respect to that request.

A read request that is retried in the foregoing manner will be received by SCD 100 and provided to load control logic 400. Assume that the programmable threshold associated with read requests has been reached. Therefore, load control logic will provide request information on lines 432 to live-lock logic 430 indicating the request must be retried. Recall that this information includes a retry signal on line 525 and the requester ID on lines 520. This requester ID is provided to retry read CAM to perform a search on all enabled entries.

Assume that the requester associated with the retried request has attained elevated status in the manner described above. As such, an entry exists for this requester ID in retry read CAM 500 with a status of "Source ID valid/TTQ pointer invalid". When this entry is located, a TTQ pointer that is provided by load control logic on lines 432 and 527 is entered into TTQ pointer field 506. The loading of this pointer is enabled by the successful search for the requester ID as well as a load TTQ signal provided by load control logic on lines 432 and 529.

The TTQ pointer provided on lines 432 and 527 identifies the TTQ entry that will receive the retried request. Additionally, state field 508 will transition to "source ID valid/TTQ pointer valid" to indicate that a valid TTQ pointer has now been stored within the entry. Finally, CAM provides a signal on line 434 indicating that the threshold limit for this request should be blocked since this request has attained an elevated state. This signal is provided to load control logic on lines 434.

When load control logic 400 receives the indication on lines 434 to block the threshold limit, and if threshold 2 has not yet been met, the request is stored to one of TTQ entries and tracked in association with threshold 2 in the manner discussed above. If threshold 2 has been reached, the request must be retried. Therefore, the request is stored in TTQ in association with threshold 3, and will be retried in the manner discussed above. In this latter instance, the entry within retry read CAM for this request must be converted back to a status of "Source ID valid/TTQ pointer invalid". This is accomplished as follows.

When a TTQ state machine provides a response to response out queue 212, various control signals are also provided to live-lock logic 430 on lines 209. These signals include a TTQ pointer that identifies the TTQ entry that stores the request associated with the response. These signals also include a response type indicating whether the response is a retry response. These signals are provided to retry read CAM 500 on lines 550 and 552, respectively. The TTQ pointer on lines 550 is used to search the TTQ pointer field 506 of all enabled CAM entries. If an entry is located having the corresponding TTQ pointer and a state field of "source ID valid/TTQ pointer valid", and if the response type indicates a retry is occurring, the state 508 transitions back to "source ID valid/TTQ pointer invalid". This entry will be handled in the manner discussed above the next time the requester that is identified by this entry issues a request.

Next, assume that a read request attained elevated status and was processed to completion. This processing includes issuing any necessary snoop request needed to obtain the requested data so that the data may be provided to the requester. When a TTQ state machine provides the response including this data to response out queue 212, various control signals are provided to live-lock logic 430 on lines 209 in the manner similar to that described in the foregoing paragraph in regards to retry responses. In this case, a retry indication will not be provided to the live-lock logic, however. Therefore, when the associated entry is located within retry read CAM 500, state field 508 transitions from "source ID valid/TTQ pointer valid" to "available". This effectively removes the request from the CAM, and enables the CAM entry to receive another requester based on the search performed by counter 534 in the manner described above.

The foregoing paragraphs discuss the general case involving processing of high-priority read requests. This processing will most often result in the return of data to the requester. However, a special-case scenario exists that involves the detection of a "snoop conflict". When this scenario is encountered, the high-priority read request that has entered TTQ 204 must again be retried.

A snoop conflict may arise as follows. Assume a first requester has obtained a cache line of data with write privileges, as is recorded by directory 101. Assume further that the first requester discards this cache line without modifying it. Moreover, the data is discarded without notifying SCD 100, as is considered acceptable in one embodiment of the system of FIG. 1. As a result, directory 101 maintains an outdated record indicating that the first requester maintains a copy of the data.

Sometime after the data is discarded, the first requester determines that it again requires use of this data and issues a read request to SCD 100. Around this same time, SCD receives a second request for the same data from another requester within the system. The SCD may process the first request before the second or vice versa. In either case, the SCD will eventually issue a snoop request to the first requester as a result of receiving the second request.

Assume the first requester receives a snoop request for the data before it receives a response to its read request. In this case, the first requester will be unable to determine how it should respond to the snoop request for the following reason. As mentioned above, in one embodiment, SCD 100 includes multiple virtual channels that allow snoop requests to be issued to a requester independently of data responses. For this reason, a snoop request may by-pass an earlier-issued data response, or vice versa. Before the first requester can determine how to respond to the snoop request in an appropriate manner, it must determine whether this type of by-pass situation has occurred. This information will be provided by the data response. In particular, if the data response indicates that the read request is to be retried, the first requester may assume that the second request was processed first. The first requester therefore responds to the snoop request by indicating that it does not have a copy of the data. However, if the data response returns data, the first requester determines the SCD processed the first request before the second request. The first requester, which for discussion purposes will be assumed to be a PND 102, may provide the data to whichever IP initiated the request. The PND may then respond to the snoop request appropriately. The snoop response may include the return of data that was updated by the IP.

The type of snoop conflict scenario described above may be encountered during the processing of a high-priority read. For example, assume that the first requester in the example above has obtained an elevated status. This request is entered into TTQ 204 for processing. However, after the TTQ entry has been created, it is determined that the second request was already processed. That is, a snoop request is outstanding to the first requester for the same data requested by the first requester. Therefore, TTQ state machine generates a retry response to the first requester so that the first requester can determine the order in which requests were processed by SCD 100. This retry response is entered into response out queue 212.

In addition to the foregoing, the state machine provides information associated with this retry response to live-lock logic 430 on lines 209, as discussed above. This information includes the TTQ pointer on lines 550, and the retry response type on lines 552, both of which are provided to retry read CAM 500. The TTQ pointer is used to search TTQ pointer field 506 of all enabled entries to determine whether an entry exists for this pointer having a state of "source ID valid/TTQ pointer valid". If so, and because the response type indicates a retry is being initiated, the state field 508 of this entry is modified to "Source ID valid/TTQ pointer invalid". The next time a read request is received from the same requester, this CAM entry will transition back to the "Source ID valid/TTQ pointer valid" state in the manner described above so that the request can be processed to completion.

Finally, several additional special-case scenarios may be considered. One scenario involves the situation wherein a requester ID is being loaded into a CAM entry to elevate the priority of that requester. In one embodiment, if that requester is making a request at approximately the same time, the state of the CAM entry may transition directly from "available" to "Source ID valid/TTQ pointer valid" so that the request receives an elevated status. In another embodiment, this state transition is not allowed, and the request must be retried once before it can gain the elevated status.

According to another special-case scenario, a small system configuration may result in only a few requesters being included within the partition. In this case, more than one CAM entry may exist with a state of "source ID valid/TTQ pointer invalid" for a given requester. This is allowed, so long as a read request from this requester causes only one of these entries to transition to the state of "source ID valid/TTQ pointer valid".

Figure 6:
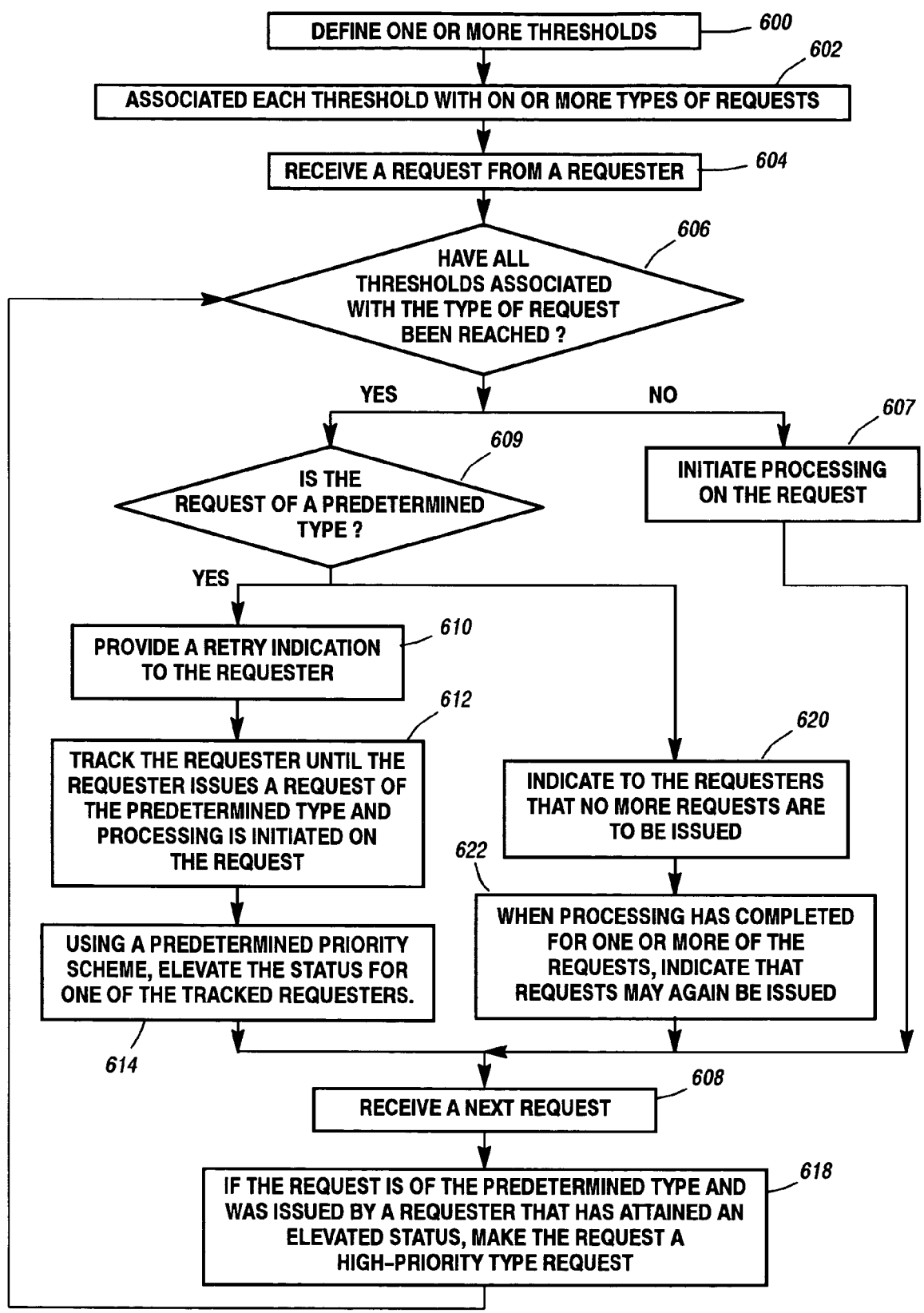
FIG. 6 is a flow diagram of one method according to the current invention.

FIG. 6 is a flow diagram describing one method of managing requests according to the current invention. First, one or more thresholds are defined (600). As noted above, these thresholds may be programmably selected using scan-set logic or some other programming interface. Each threshold is then associated with one or more types of requests (602). This association may also be performed programmably, or may be "hardwired". A request is then received from one of the multiple requesters (604).

Next, it is determined whether each of the one or more thresholds associated with the type of the received request has been reached (606). As noted above, a threshold is reached when the cumulative number of requests being processing that are any of the associated request types reaches the defined threshold value. If not all thresholds associated with the request type have been reached, processing may be initiated for the request (607), and another request may be received (608). If, however, each of the one or more thresholds associated with the type of request has been reached (606), a retry indication is provided to the requester if the request is of a predetermined request type (609, 610). This retry indication will cause the requester to re-issue the same, or a different, request at a later time. In one embodiment, retry indications are only provided for read-type requests. In another embodiment, retry indications may be provided for all, or any other sub-set of all, request types.

After a retry indication is provided to a requester, the identity of the requester is tracked (612). In one embodiment, this tracking may be continued until the requester issues a request of the predetermined type and processing is initiated on this request. In another embodiment wherein a request may be removed from the retry read CAM 500 after processing is initiated because of a snoop conflict in the manner described above, it is desirable to continue tracking a requester until a response has been issued to that requester indicating request completion. According to one aspect of the exemplary system described above, the predetermined request type is a read-type request. Other types may be employed in alternative embodiments.

Next, using a predetermined priority scheme, one of the tracked requesters is granted an elevated status (614). In one embodiment, a rotating priority scheme is utilized for this purpose, although other mechanisms may be used in the alternative.

Another request may be received (608). If the request is of the predetermined type discussed above, and if the request was issued by a requester that has been granted an elevated status, the request is made a high-priority type request (618). Processing then continues with step 606, where it is determined whether all thresholds associated with the type of the request have been reached.

It will be noted that in one implementation, a high-priority type request such as a retried read request that has been granted elevated status will be associated with one or more thresholds that are not associated with some other lower-priority requests. This allows processing to be initiated on high-priority requests in an expedited manner. By elevating the status of some requests in this rotating manner, live-lock situations are avoided.

Returning to step 608, assume that all thresholds associated with a request type have been reached, but the request is not of the predetermined type that results in issuance of a retry indication. In one embodiment, this situation results in the activation of a hold signal to requesters indicating that no more requests are to be issued (620). In the exemplary embodiment described above, this may potentially occur for retried read requests, write requests, or high-priority requests after all thresholds associated with the particular request type have been reached. When processing has been completed for one or more of the requests, an indication is provided to requesters that requests may again be issued (622). Processing then continues with step 608.

While the system and method of the current invention is described above as controlling the entry of requests into a queue structure, it may be employed to control access to any shared resources or pool of shared resources. It will therefore be understood that the embodiments and formats described above are merely exemplary and many other alternative embodiments are possible. Thus, the scope of the invention is indicated only by the claims that follow rather than by the foregoing description.

What is claimed is:

1. A method for allowing a request that is any of multiple types to gain access to a resource, comprising:
   a.) defining multiple thresholds, each representing a respective predetermined number of requests;
   b.) associating each threshold with one or more of the types, and wherein at least one of the types is associated with multiple thresholds;
   c.) receiving a request; and
   d.) if any of the thresholds associated with the type of the received request has not yet been exceeded such that for the threshold, the respective predetermined number of requests of the one or more associated types have not yet gained access to the resource, granting the request access to the resource.

2. The method of claim 1, and further including determining that the request must be retried if each threshold that is associated with the type of the request has been exceeded.

3. The method of claim 2, and further including tracking a requester that issued the request after a determination is made that the request must be retried.

4. The method of claim 3, and further including:
   receiving a request from a tracked requester; and
   allowing the request from the tracked requester to gain access to the resource even if each of the thresholds associated with the type of the request received from the tracked requester has been reached.

5. The method of claim 4, and further including discontinuing tracking of a tracked requester after a request from the tracked requester is allowed to gain access to the resource.

6. The method of claim 4, and further including:
   creating a partition that includes one or more requesters issuing requests to the the resource; and
   allowing the request from the tracked requester to gain access to the resource only if the tracked requester is one of the one or more requesters included in the partition.

7. The method of claim 6, wherein the one or more predetermined types include read requests.

8. The method of claim 4 wherein multiple requesters are being tracked, and further including utilizing a predetermined priority scheme to select a request from one of the multiple tracked requesters to gain access to the resource.

9. The method of claim 2, wherein a determination that the request must be retried is only made if the request is any of one or more predetermined types.

10. The method of claim 2, and further including allowing the request to gain access to the resource for purposes of causing the request to be retried.

11. The method of claim 1, wherein step a.) is performed programmably.

12. The method of claim 1, where step b.) is performed programmably.

13. The method of claim 1, wherein at least one of the thresholds is associated with a subset of the request types that are associated with a different one of the thresholds.

14. A method of processing requests issued to a shared resource by multiple requesters within a data processing system, wherein each request is any one of multiple types, the method comprising:
   a.) defining one or more thresholds, each threshold being associated with one or more of the types and at least one of the types being associated with multiple thresholds, each threshold indicating the maximum number of requests of any of the associated types that may be pending simultaneously to the shared resource;
   b.) receiving a request; and
   c.) determining, for each threshold associated with the type of the request, whether the maximum number of requests indicated by the threshold has been reached, and if not, initiating processing on the request.

15. The method of claim 14, wherein step a.) includes programmably selecting the one or more thresholds.

16. The method of claim 15, wherein step a.) includes programmably associating each of the thresholds with the one or more types.

17. The method of claim 14, and further including providing an indication to retry the request if the maximum number indicated by each threshold associated with the type of the request has been reached.

18. The method of claim 17, and further including performing the providing step only for predetermined types.

19. The method of claim 17, and further including:
selecting a requester that has been provided an indication to retry a request;
receiving an additional request from the selected requester; and
initiating processing of the additional request even if, for each threshold associated with the type of the additional request, the maximum number indicated by the threshold has been reached.

20. The method of claim 19, wherein the selecting step is performed using a rotational priority scheme applied to all requesters that have received an indication to retry a request and which have not subsequently issued a request for which processing was completed.

21. The method of claim 14, wherein the request types are selected from the group consisting of read requests, write requests, retry requests, and high-priority read requests.

22. The method of claim 14, and further including:
associating a first threshold with all request types;
associating a second threshold with a first subset of all request type;
associating a third threshold with a sub-set of the first sub-set; and
wherein the first threshold is indicative of a number that is less than the number indicated by the second threshold, which is less than the number indicated by the third threshold.

23. The method of claim 14, and further including providing an indication to requesters to stop issuing requests if all of the one or more thresholds have been reached.

24. A system for controlling the manner in which requests are provided to a shared resource, comprising:
one or more storage devices, each to store a respective threshold value that is associated with one or more types of requests and wherein at least one of the types of requests is associated with multiple threshold values, each threshold value indicating a cumulative number of requests of the associated types that may gain access to the shared resource at any given time before the threshold value is reached;
load control logic coupled to each of the storage devices to receive requests, and to allow each request to gain access to the shared resource if the type of the request is associated with a threshold value that has not yet been reached; and
live-lock logic coupled to the load control logic to selectively elevate the status of a request that is of a type associated with one or more thresholds values that have been reached, thereby allowing the request to gain expedited access to the shared resource.

25. The system of claim 24, wherein the load control logic includes retry logic to provide an indication that a request must be retried at a later time if all threshold values associated with the type of the request have been reached.

26. The system of claim 25, wherein the live-lock logic includes:
a retry storage device to track each requester that issued a request for which a retry indication was provided; and
priority logic coupled to the storage device to select a requester that is being tracked; and
logic coupled to the retry storage device to provide elevated status for a request issued by a selected requester, whereby the request is allowed to gain access to the shared resource even if all threshold values that are associated with the type of the request have been reached.

27. The system of claim 26, wherein one of the one or more storage devices stores a threshold value associated with requests having an elevated status.

28. The system of claim 26, wherein the priority logic includes circuits to implement a rotational priority scheme.

29. The system of claim 24, and further including one or more second storage devices coupled to the load control logic, each respectively associated with one of the one or more storage devices, each to store an indication of the one or more request types that are associated with the threshold value stored by the respectively associated one of the one or more storage devices.

30. The system of claim 29, and further including a programming interface coupled to the one or more storage devices and the second one or more storage devices to programmably select the stored threshold values and the stored indications of the one or more request types.

31. A system for controlling the manner in which requests of any of one or more request types access multiple resources, comprising:
threshold means for storing one or more threshold values, each threshold value for being associated with one or more of the request types and at least one of the request types being associated with multiple threshold values, each threshold value for specifying a cumulative maximum number of requests of associated request types that may gain access simultaneously to any of the resources; and
load control means for receiving a request and for determining whether the request is of a type associated with one or more threshold values for which the specified cumulative maximum number of requests has not yet gained simultaneous access to the multiple resources, and if so, for allowing the request to gain access to any available one of the multiple resources.

32. The system of claim 31, and further including live-lock means for elevating the status of the request to allow the request to gain access to any available one of the multiple resources regardless of whether the request is of a type associated only with threshold values for which the specified cumulative maximum number of requests has gained simultaneous access to the multiple resources.

* * * * *